June 24, 1952 L. W. MARSHALL 2,601,407
DEVICE FOR SUPPORTING PIPE FITTINGS FOR WELDING
Filed June 22, 1951
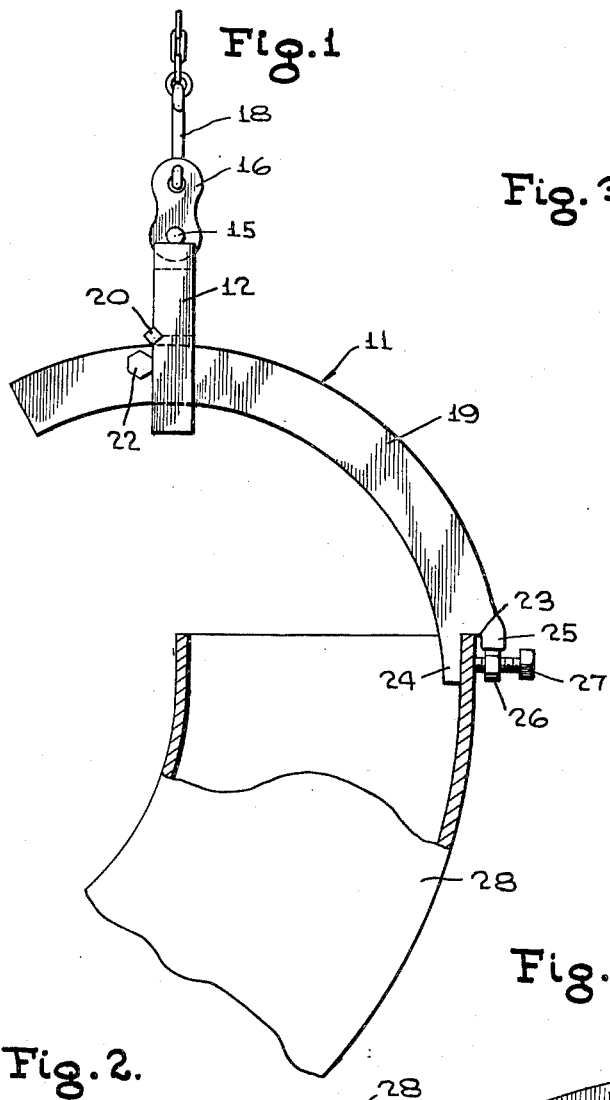
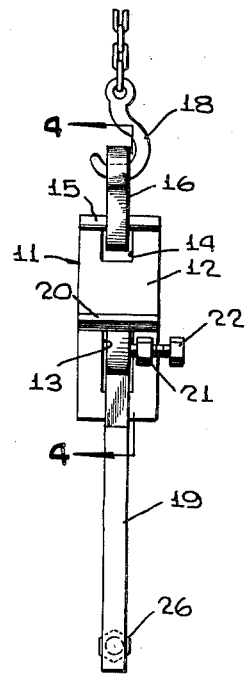
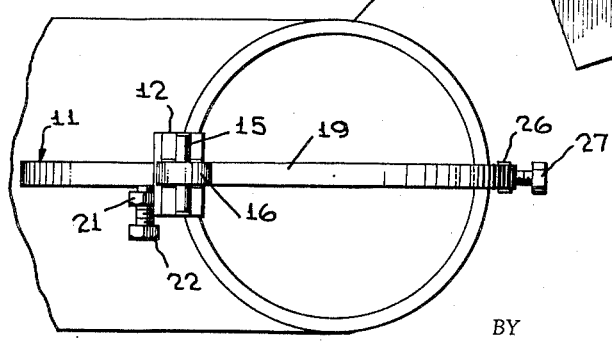
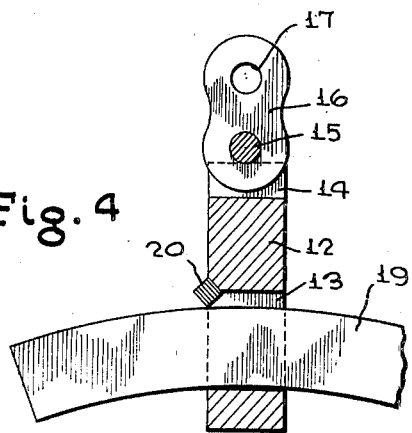
INVENTOR
LEE W. MARSHALL
BY
McMorrow, Berman + Davidson
ATTORNEYS Patented June 24, 1952

2,601,407

UNITED STATES PATENT OFFICE 2,601,407

DEVICE FOR SUPPORTING PIPE FITTINGS FOR WELDING

Lee W. Marshall, Terre Haute, Ind.

Application June 22, 1951, Serial No. 232,971

3 Claims. (Cl. 294—78)

This invention relates to support devices, and more particularly to a device for suspending large pipe fittings and sections of tubing and for supporting the pipe fittings and tubing in proper position for welding or similar operations.

A main object of the invention is to provide a novel and improved supporting device for holding pipe fittings or pipe sections in position for welding or similar operations, the improved supporting device being simple in construction, involving only a few parts, and providing a substantial saving in time and labor in supporting pipe fittings and sections of tubing in proper position for welding and for similar operations.

A further object of the invention is to provide an improved supporting device for holding large pipe fittings and similar tubular sections in proper position for welding or for similar operations thereon, the improved device being inexpensive to construct, being durable in construction, and providing a sure and stable grip on the pipe fitting or tubular section held thereby.

Further objects and advantages of the invention will become apparent from the following description and claims, and from the accompanying drawings, wherein:

Figure 1 is a side elevational view showing an improved supporting device according to the present invention employed to support a curved tubular section;

Figure 2 is a top view of the supporting device of the present invention as employed in Figure 1;

Figure 3 is a front end elevational view of the supporting device of Figures 1 and 2;

Figure 4 is an enlarged cross-sectional detail view taken on line 4—4 of Figure 3.

Referring to the drawings, the supporting device is designated generally at 11, and comprises a first link bar 12 which is generally rectangular in shape and which is formed at its lower portion with a vertical slot 13. The bar 12 is formed with an upwardly facing notch 14 at its top end, and welded to the top margin of the bar 12 across said notch 14 is a cylindrical bar 15 on which is pivotally engaged a second link bar 16. As shown in Figures 3 and 4, the lower portion of the link bar 16 is received in the notch 14, whereby the bar 16 may pivot freely on the cylindrical rod 15. The upper portion of the bar 16 is formed with an aperture 17 adapted to receive the hook 18 of a hoist or similar weight-lifting and supporting machine.

Designated at 19 is a flat, arcuate bar member extending through the slot 13. Welded transversely across the bar member 12 at the upper left end of slot 13, as viewed in Figures 1 and 4, is a section of square bar stock 20 arranged so that one corner thereof is directed downwardly and is adapted to engage the top edge of the arcuate bar 19. Welded to the side edge of bar 12 below the squared section 20 is a hexagonal nut 21 through which is engaged an element or bolt 22. When the bolt 22 is tightened, said bolt clampingly engages the arcuate bar 19 and securely locks said arcuate bar against movement relative to the supporting bar member 12. The lower end of the bar 19 is formed with a downwardly facing notch 23 having a relatively long, inner leg 24 and a relatively short, outer leg 25. Welded to the outer leg 25 is a hexagonal nut 26 in which is threadedly engaged a bolt 27. As shown in Figure 1, the outer portion of the top rim of a curved section of tubing 28 may be engaged in the notch 23 and may be clamped against the arm 24 by tightening the bolt 27.

In using the device, both bolts 22 and 27 are initially loosened and the lower end of the bar 19 is engaged on the outer top rim portion of the tubular section 28 to be suspended. The bolt 27 is then tightened. The upper portion of the arcuate bar 19 is, of course, engaged in the slot 13, and when lifting force is applied to the hook 18, the bar 19 is engaged by the bottom corner of the gripping section 20 as the load is elevated by hook 18. The position of the tubular section 28 may be adjusted to a desired orientation, after which the bolt 22 is tightened, thereby clamping the bar 19 relative to the bar member 12. The section of tubing 28 may then be elevated into position for welding or other operations, the device 11 serving to maintain the pipe fitting 28 or tubular section in its adjusted position relative to the section of tubing or other object to which it is to be welded.

After the welding or other operation has been completed, the supporting device may be disengaged from the section of tubing 28 by loosening the bolt 27, allowing the top edge of the tubing to be disengaged from the notch 23.

While a specific embodiment of an improved supporting device for holding pipe fittings or sections of tubing in position for welding or other operations thereon has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A supporting device for pipe fittings and the like comprising a link bar, said link bar being formed with a vertical slot, an arcuate bar member extending through said slot, pipe-gripping means on the lower end of said arcuate bar member, a depending anchoring element secured transversely on the link bar at the top end of said slot on the side of said link bar opposite the lower end of said arcuate bar member, said anchoring element being arranged to grippingly engage the top edge of said arcuate bar member responsive to the application of a load to the lower end of said arcuate bar member and an element carried by said link bar and arranged to clampingly engage said arcuate bar member.

2. A supporting device for holding pipe fittings and the like in position for welding comprising a link bar, said link bar being formed with a vertical slot, an arcuate bar member extending through said slot, pipe-gripping means on the lower end of said arcuate bar member, a depending anchoring element secured transversely on the link bar at the top end of said slot on the side of said link bar opposite the lower end of said arcuate bar member, said anchoring element being arranged to grippingly engage the top edge of said arcuate bar member responsive to the application of a load to the lower end of said arcuate bar member, and a clamping screw threadedly engaged with said link bar and arranged to clampingly engage said arcuate bar member.

3. A supporting device for holding pipe fittings in position for welding comprising a first link bar, said link bar being formed with a vertical slot, an arcuate bar member extending through said slot, said arcuate bar member being formed with a notch at its lower end, a clamping screw threaded through one wall of said notch and arranged to grip the wall of a pipe fitting inserted in said notch, a clamping screw threadedly engaged with said link bar and arranged to clampingly engage said arcuate bar member, a depending anchoring element secured transversely on the link bar at the top end of said slot on the side of said link bar opposite the lower end of said arcuate bar member, said anchoring element being arranged to grippingly engage the top edge of said arcuate bar member responsive to the application of a load to the lower end of said arcuate bar member, and a second link bar hinged to the top end of said first link bar, said second link bar being formed at its upper portion with an aperture adapted to receive a lifting means.

LEE W. MARSHALL.

REFERENCES CITED

The following references are of record in the file of this patent:

UNITED STATES PATENTS

| Number | Name | Date |
|---|---|---|
| 1,774,623 | Williams | Sept. 2, 1930 |
| 2,329,008 | Smith | Sept. 7, 1943 |
| 2,348,309 | Rohr | May 9, 1944 |